United States Patent
Lin et al.

(10) Patent No.: US 6,891,719 B2
(45) Date of Patent: May 10, 2005

(54) PANEL ANTENNA AND METHOD FOR INSTALLING THE SAME

(75) Inventors: Hsien-Chu Lin, Tu-chen (TW); Chieh Chao Yu, Tu-chen (TW); Yung-Chien Chung, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/327,847

(22) Filed: Dec. 23, 2002

(65) Prior Publication Data

US 2004/0109284 A1 Jun. 10, 2004

(30) Foreign Application Priority Data

Dec. 10, 2002 (TW) .......................................... 91135754

(51) Int. Cl.[7] .............................................. G06F 1/16
(52) U.S. Cl. ................. 361/683; 361/679; 343/700 MS
(58) Field of Search ................................ 361/679, 683, 361/685–686; 343/700 MS, 702, 718, 872, 873

(56) References Cited

U.S. PATENT DOCUMENTS

| | | | |
|---|---|---|---|
| 5,373,149 A | * | 12/1994 | Rasmussen ................. 235/492 |
| 5,430,617 A | * | 7/1995 | Hsu ........................... 361/818 |
| 6,181,284 B1 | | 1/2001 | Madsen et al. |
| 6,359,591 B1 | | 3/2002 | Mou |
| 6,545,643 B1 | * | 4/2003 | Sward et al. ............... 343/702 |

* cited by examiner

Primary Examiner—Yean-Hsi Chang
(74) Attorney, Agent, or Firm—Wei Te Chung

(57) ABSTRACT

A panel antenna (2) and a method for installing the same on an electronic device (not labeled), includes a panel (101), an antenna body (21), a cable (23), and a connector (22). The electronic device includes a case (1), with at least an expansion slot (100) openable on a surface of the case. The antenna body is mounted on the panel and the panel antenna is received in the expansion slot. The installation method includes the following steps: attaching the antenna body and the connector to either end of the cable; attaching the antenna body to the inside wall of the panel; electrically connecting the connector of the panel antenna to the mating connector (not labeled) of the electronic device; mounting the panel with the antenna body attached thereon in one of the expansion slots of the computer, with the engaging sides screwed or engaging with the opening of the expansion slot and the panel covering the opening.

16 Claims, 2 Drawing Sheets

PANEL ANTENNA AND METHOD FOR INSTALLING THE SAME

CROSS-REFERENCE TO RELATED APPLICATION

This application is a co-pending application of patent applications entitled "ELECTRICAL DEVICE HAVING ANTENNA ASSEMBLY", and entitled "ANTENNA ASSEMBLY AND METHOD OF ASSEMBLING THE SAME", invented by same inventor, and assigned to the same assignee of the present invention.

BACKGROUND OF THE INVENTION

1. Field of the Invention

The present invention generally relates to an antenna and its method of installation, and more particularly to a panel antenna and its method of installation on an electronic device.

2. Brief Description of the Related Art

With the development of wireless communication technology, especially the development of Wireless Local Area Network (WLAN), many electronic devices, such as computers and notebooks, have the function of wireless telecommunication at close range. To achieve this function, an antenna is used in the electronic device for receiving and transmitting radio signals. Prior art, method of mounting an antenna to a computer include mounting the antenna to inside wall of the computer using screw. This method can disfigure the outward appearance of the computer, and is inconvenient. A second method is to mount the antenna on the outside of a bracket attached to a wireless PCI card. However, with this method the antenna is exposed to an outside of the computer housing and can be easily damaged.

Hence, an improved antenna and method of installation are desired.

BRIEF SUMMARY OF THE INVENTION

An object of the present invention is to provide an antenna for mounting to an electronic device which does not disfigure the outward appearance of the electronic device and which effectively protects the antenna.

A second object of the present invention is to provide a method of installing an antenna meeting the above object in an electronic device.

A panel antenna in accordance with a preferred embodiment of the present invention, for being mounted in an electronic device, comprises a panel, an antenna body, a connector and a cable electrically connecting the connector and the antenna body. The electronic device includes a case and at least an expansion slot on a surface of the case. The antenna body is attached to an inside wall of the panel, and the panel is received in said expansion slot. The connector is electrically connected to a corresponding connector disposed inside the electronic device.

A method of installation of the panel antenna in accordance with a preferred embodiment of the invention comprises the following steps: attaching the antenna body and the connector to either end of the cable; attaching the antenna body to the inside wall of the panel; electrically connecting the connector of the panel antenna to the mating connector of the electronic device; mounting the panel with the antenna body attached thereon in one of the expansion slots of the computer, with the engaging sides screwed or engaging with the opening of the expansion slot and the panel covering the opening.

Other objects, advantages and novel features of the invention will become more apparent from the following detailed description of a preferred embodiment when taken in conjunction with the accompanying drawings.

DETAILED DESCRIPTION OF THE INVENTION

Figure 1:
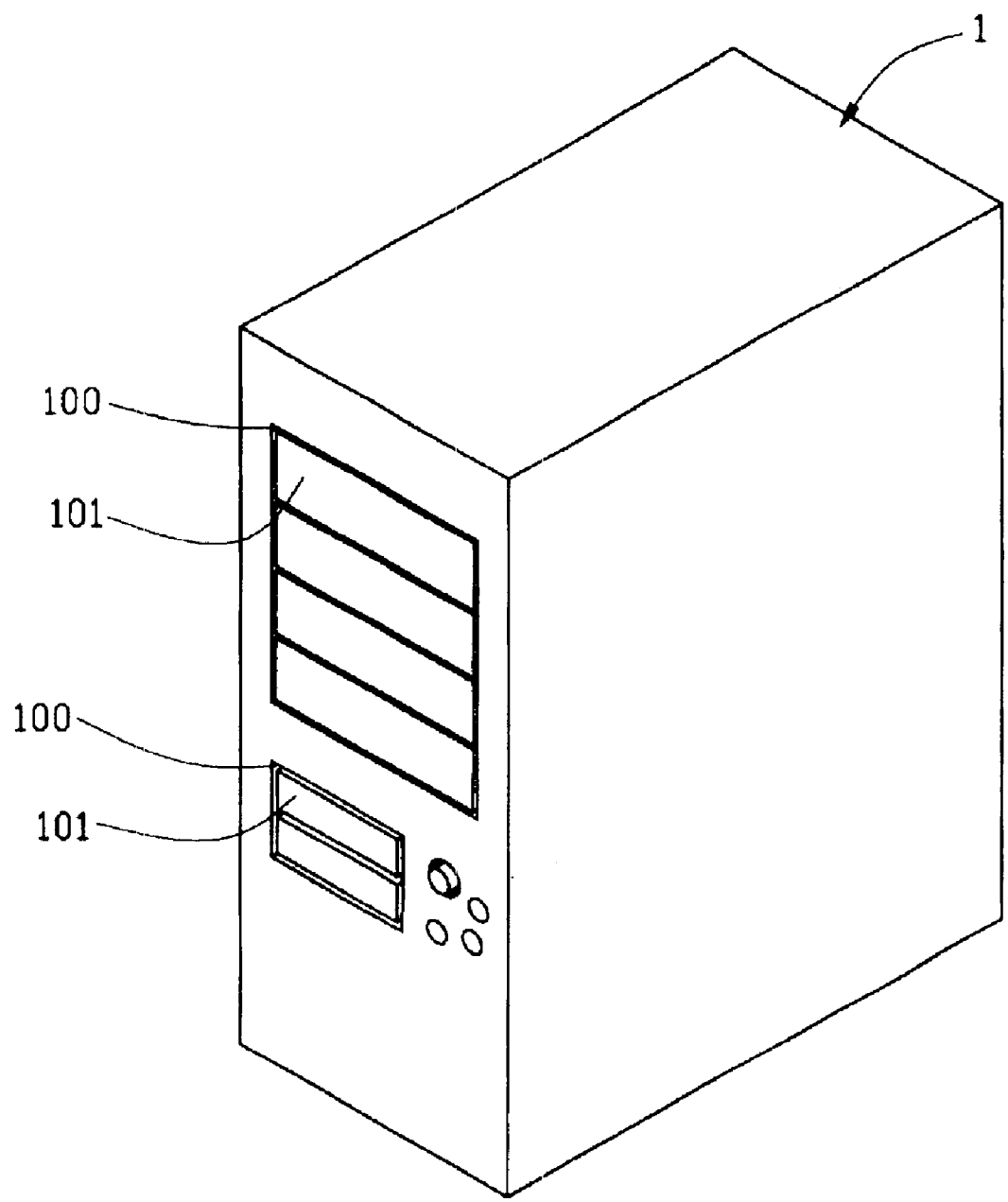
FIG. 1 is a perspective view of a computer case mounting a panel antenna in accordance with the present invention.
Figure 2:
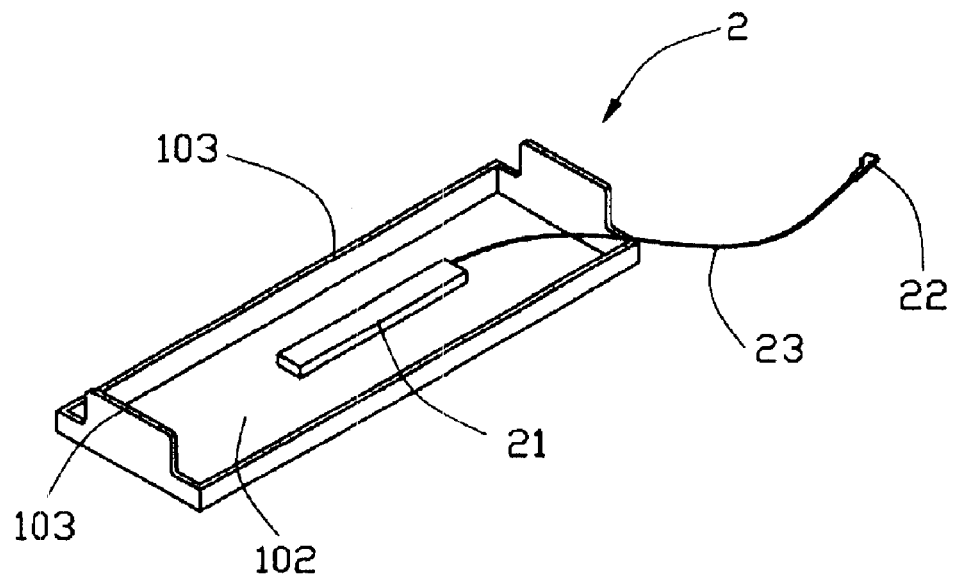
FIG. 2 is a perspective view of the panel antenna in accordance with the present invention. From a rearside aspect.
Figure 3:
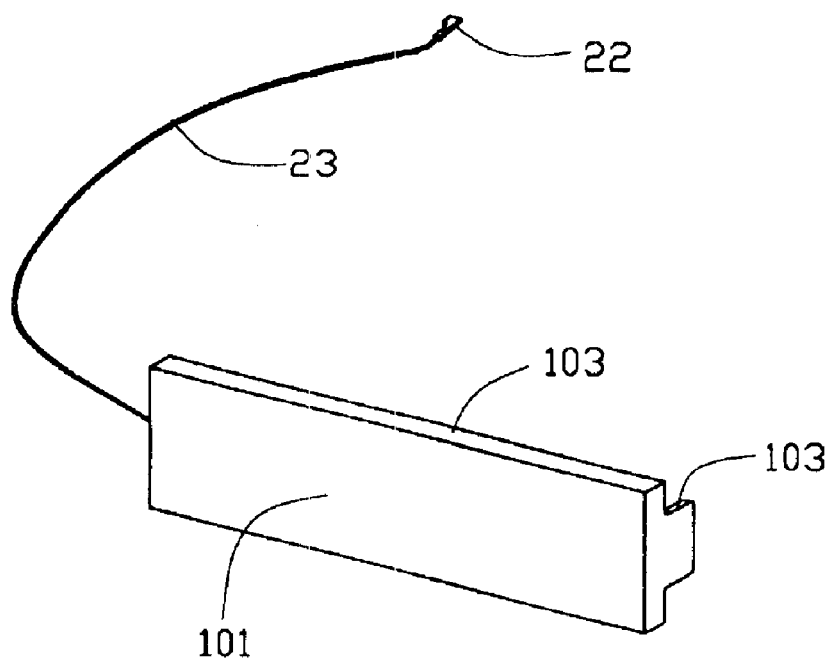
FIG. 3 is a perspective of the panel antenna in FIG. 2 shown from a front side aspect.

Referring to FIGS. 1–3, a panel antenna 2 in accordance with a preferred embodiment of the present invention is mountable to an electronic device (not labeled) having a cable. The panel antenna comprises a panel 101, an antenna body 21, a connector 22, and a cable 23 that electrically connects the antenna body 21 with the connector 22. The panel 101 comprises an inside wall 102 and some engaging sides 103 disposed around the inside wall 102 for engaging with the electronic device. The antenna body 21 is attached by adhesive or other means to the inside wall 102, and the cable 23 is electrically connected between the antenna body 21 and the connector 22. In the preferred embodiment, the electronic device is computer (not labeled), which include the case 1 and has a plurality of printed circuit boards (PCBs) (not shown) disposed inside the case 1, and furthermore has a mating connector corresponding to the connector 22 of the panel antenna 2 disposed on a PCB. A plurality of 5.25 and 3.5 inch expansion slots 100 are openable from a front surface (not labeled) of the case 1. The 5.25 inch expansion slots can be used for receiving hard disk drives (not shown), and the 3.5 inch expansion slots can be used for receiving floppy disk drives (not shown).

The panel antenna 2 in accordance with the present invention is mountable in one of the 5.25 inch or 3.5 inch expansion slots, depending on the size of the panel 101. An preferred method of its installation comprises the following steps: attaching the antenna body 21 and the connector 22 to either end of the cable 23; attaching the antenna body 21 to the inside wall 102 of the panel 101; electrically connecting the connector 22 of the panel antenna 2 to the mating connector of the electronic device; mounting the panel 101 with the antenna body 21 attached thereon in one of the expansion slots 100 of the computer, with the engaging sides 103 screwed or engaging with the opening of the expansion slot 100 and the panel 101 covering the opening.

Since computers in normal use commonly have unused expansion slots 100 in the computer case 1, the panel antenna 2 in accordance with the present invention is conveniently accommodated. In practice, the antenna body 21 can be assembled to the panel 101 by using screw or an adhesive, or other means of attachment. Furthermore the antenna body 21 is very easy and inexpensive to change since only needs to swap out one panel antenna 2 with a new panel antenna 2.

An advantage of the present invention is that the antenna body 21 is attached to the inside wall 102 of the panel 101, and is then mounted in the expansion slot 100 of the case 1, so the outward appearance of the computer case is not affected and the antenna body 21 is effectively protected.

Panel antenna of the same general design are easily adapted for use in a notebook or other electronic devices, and this disclosure is intended to encompass their use in such other electronic device.

It is to be understood, however, that even though numerous, characteristics and advantages of the present invention have been set forth in the foregoing description, together with details of the structure and function of the invention, the disclosed is illustrative only, and changes may be made in detail, especially in matters of shape, size, and arrangement of parts within the principles of the invention to the full extent indicated by the broad general meaning of the terms in which the appended claims are expressed.

What is claimed is:

1. A panel antenna for mounting in an electronic device, wherein the electronic device includes a case, with at least an expansion slot and a mating connector mounted inside the case, the expansion slot having an opening openable on a surface of the case, comprising:

a panel substantially coplanarly received in the opening and mountable over the opening of the expansion slot of the case;

an antenna body attached to an inside wall of the panel;

a connector electrically connecting to the mating connector disposed in the case of the electronic device; and a cable electrically connecting the antenna body with the connector, wherein the panel antenna is received in the expansion slot.

2. The panel antenna as claimed in claimed 1, wherein the antenna body is attached to said panel by screw or by adhesive.

3. The panel antenna as claimed in claim 2, wherein the panel includes a plurality of engaging sides disposed at sides of said panel for engaging with the opening of the expansion slot.

4. The panel antenna as claimed in claim 3, wherein said electronic device is a computer.

5. The panel antenna as claimed in claim 1, wherein the cable directly connects the antenna body and the connector.

6. A method of installing a panel antenna in an electronic device wherein the panel antenna comprise a panel with an antenna attached to an inner surface thereof and a cable attached between the antenna and a connector, comprising steps of:

attaching the antenna body and the connector to either end of the cable;

attaching the antenna body to the inside wall of the panel;

electrically connecting the connector of the panel antenna to the mating connector of the electronic device;

mounting the panel with the antenna body attached thereon in one of the expansion slots of the computer, with the engaging sides screwed or engaging with the opening of the expansion slot and the panel covering the opening.

7. The method as claimed in claim 6, wherein the antenna body is attached to said panel by screw or adhesive.

8. The method as claimed in claim 7, wherein said panel includes a plurality of engaging sides disposed therearound for engaging with the opening of the expansion slot.

9. The method as claimed in claim 8, wherein said electronic device is a computer.

10. The panel antenna as claimed in claim 6, wherein the panel is substantially coplanarly received in the opening of the expansion slot of the computer.

11. The panel antenna as claimed in claim 6, wherein the cable directly connects the antenna body and the connector.

12. An electronic device comprising:

an enclosure having a front face defining a plurality of drive openings in communication with an exterior for allowing at least a corresponding drive to extend therethrough for installation into said device;

at least a panel detachably mounted into one of said openings from said exterior and substantially coplanar with the front face of the enclosure, said panel including an inside wall compliantly and substantially coplanarly received in said one of said openings, and at least one retention device extending from said inside wall retainably engaged with said enclosure;

an antenna element attached on a back side of the panel; and a connector connected to said antenna element via a flexible wire.

13. The device as claimed in claim 12, wherein said retention device is retainably engaged with the front face.

14. The device as claimed in claim 13, wherein said retention device is retainably engaged with a periphery of said opening of the front face.

15. The device as claimed in claim 13, wherein said retention device includes a plurality of engaging sides extending rearwardly from a periphery of said inside wall.

16. The device as claimed in claim 12, wherein the antenna element is received in the one of said openings.

\* \* \* \* \*